United States Patent
Li et al.

(10) Patent No.: US 11,322,138 B2
(45) Date of Patent: May 3, 2022

(54) VOICE AWAKENING METHOD AND DEVICE

(71) Applicant: Baidu Online Network Technology (Beijing) Co., Ltd., Beijing (CN)

(72) Inventors: Jun Li, Beijing (CN); Rui Yang, Beijing (CN); Lifeng Zhao, Beijing (CN); Xiaojian Chen, Beijing (CN); Yushu Cao, Beijing (CN)

(73) Assignees: Baidu Online Network Technology (Beijing) Co., Ltd., Beijing (CN); Shanghai Xiaodu Technology Co., Ltd., Shanghai (CN)

( * ) Notice: Subject to any disclaimer, the term of this patent is extended or adjusted under 35 U.S.C. 154(b) by 84 days.

(21) Appl. No.: 16/268,865

(22) Filed: Feb. 6, 2019

(65) Prior Publication Data

US 2019/0251963 A1    Aug. 15, 2019

(30) Foreign Application Priority Data

Feb. 9, 2018    (CN) .......................... 201810133876.1

(51) Int. Cl.
*G10L 15/08*    (2006.01)
*G10L 15/22*    (2006.01)
(Continued)

(52) U.S. Cl.
CPC ................ *G10L 15/22* (2013.01); *G06N 3/08* (2013.01); *G10L 15/063* (2013.01); *G10L 15/08* (2013.01);
(Continued)

(58) Field of Classification Search
CPC ....... G10L 15/22; G10L 15/063; G10L 15/08; G10L 15/16; G10L 15/32; G06N 3/08
See application file for complete search history.

(56) References Cited

U.S. PATENT DOCUMENTS

| | | |
|---|---|---|
| 2013/0185072 A1 | 7/2013 | Huang et al. |
| 2014/0088967 A1 | 3/2014 | Kawamura et al. |
| | (Continued) | |

FOREIGN PATENT DOCUMENTS

| | | |
|---|---|---|
| CN | 102314876 A | 1/2012 |
| CN | 107123417 A | 9/2017 |
| | (Continued) | |

*Primary Examiner* — Nafiz E Hoque
(74) *Attorney, Agent, or Firm* — Nixon Peabody LLP

(57) ABSTRACT

A voice awakening method and device are provided. According to an embodiment, the method includes: receiving voice information of a user; obtaining an awakening confidence level corresponding to the voice information based on the voice information; determining, on the basis of the awakening confidence level, whether the voice information is suspected wake-up voice information; and performing, in response to determining the voice information being the suspected wake-up voice information, a secondary determination on the voice information to obtain a secondary determination result, and determining whether to perform a wake-up operation on the basis of the secondary determination result. The embodiment implements a secondary verification on the voice information, thereby reducing the probability that the smart device is mistakenly awakened.

18 Claims, 5 Drawing Sheets

(51) Int. Cl.
  *G10L 15/16* (2006.01)
  *G06N 3/08* (2006.01)
  *G10L 15/06* (2013.01)
  *G10L 15/32* (2013.01)

(52) U.S. Cl.
  CPC .............. *G10L 15/16* (2013.01); *G10L 15/32* (2013.01); *G10L 2015/088* (2013.01); *G10L 2015/223* (2013.01)

(56) References Cited

U.S. PATENT DOCUMENTS

| | | | |
|---|---|---|---|
| 2014/0163978 A1* | 6/2014 | Basye | ..................... G10L 15/28 704/233 |
| 2015/0127594 A1* | 5/2015 | Parada San Martin | ...................... G06N 3/0454 706/16 |
| 2015/0269940 A1 | 9/2015 | Fujimura | |
| 2016/0077794 A1* | 3/2016 | Kim | ......................... G06F 3/167 704/275 |
| 2018/0342237 A1* | 11/2018 | Lee | ......................... G10L 15/08 |
| 2019/0005954 A1 | 1/2019 | Xie | |

FOREIGN PATENT DOCUMENTS

| | | |
|---|---|---|
| CN | 107134279 A | 9/2017 |
| JP | 2014-063088 A | 4/2014 |
| JP | 2015184378 A | 10/2015 |
| JP | 20016505888 A | 2/2016 |
| JP | 2017-097373 A | 6/2017 |
| JP | 2017-181667 A | 10/2017 |

\* cited by examiner

(12) United States Patent

VOICE AWAKENING METHOD AND DEVICE

CROSS-REFERENCE TO RELATED APPLICATIONS

This application claims priority to Chinese Patent Application no. 201810133876.1, filed in China on Feb. 9, 2018, the contents of which are incorporated herein by reference in their entirety.

TECHNICAL FIELD

Embodiments of the present disclosure relate to the field of computer technology, specifically to the field of Internet technology, and specifically to a voice awakening method and device.

BACKGROUND

With the development of artificial intelligence technology and the maturity of speech technology, the conversation-oriented human-like conversation interaction is becoming an innovation for a new type of interaction, and gradually turned into products, for example, smart robots, smart voice boxes, smart televisions, and smart refrigerators. These smart devices may free customers' hands from the touch interaction.

In some scenarios, a user may awaken the smart devices by means of wake-up voice. Then, the smart devices can respond to the voice command of the user.

SUMMARY

Embodiments of the present disclosure provide a voice awakening method and device.

In a first aspect, the embodiments of the present disclosure provide a voice awakening method. The method includes: receiving voice information of a user; obtaining an awakening confidence level corresponding to the voice information based on the voice information; determining, on the basis of the awakening confidence level, whether the voice information is suspected wake-up voice information; and performing, in response to determining the voice information being the suspected wake-up voice information, a secondary determination on the voice information to obtain a secondary determination result, and determining whether to perform a wake-up operation on the basis of the secondary determination result.

In some embodiments, the obtaining an awakening confidence level corresponding to the voice information based on the voice information includes: inputting the voice information into a pre-established recognition model to obtain the awakening confidence level for the voice information. The recognition model is used to represent a corresponding relationship between the voice information and the awakening confidence level.

In some embodiments, the recognition model is a neural network model, and the neural network model is trained by: acquiring a sample set, wherein a sample includes sample voice information and an annotation indicating whether the sample voice information is wake-up voice information; and performing following training: inputting respectively at least one piece of sample voice information in the sample set into an initial neural network model, to obtain a prediction corresponding to each of the at least one piece of sample voice information, wherein the prediction represents a probability of the sample voice information being the wake-up voice information; comparing the prediction corresponding to the each of the at least one piece of sample voice information with the annotation; determining, on the basis of the comparison result, whether the initial neural network model achieves a preset optimization objective; and using, in response to determining the initial neural network model achieving the preset optimization objective, the initial neural network model as a trained neural network model.

In some embodiments, training the neural network model further includes: adjusting, in response to determining the initial neural network model not achieving the preset optimization objective, a network parameter of the initial neural network model, and continuing to perform the training.

In some embodiments, the annotation includes a first identifier and a second identifier. The first identifier represents that the sample voice information is the wake-up voice information, and the second identifier represents that the sample voice information is not the wake-up voice information.

In some embodiments, the secondary determination result includes a wake-up confirmation and a non-wake-up confirmation. The performing a secondary determination on the voice information to obtain a secondary determination result and determining whether to perform a wake-up operation on the basis of the secondary determination result includes: sending the voice information to a server end, and generating, by the server end, the secondary determination result based on the voice information; receiving the secondary determination result; and performing, in response to determining the secondary determination result being the wake-up confirmation, the wake-up operation.

In a second aspect, the embodiments of the present disclosure further provide a voice awakening method. The method includes: receiving suspected wake-up voice information sent by a terminal; performing speech recognition on the suspected wake-up voice information to obtain a speech recognition result; comparing the speech recognition result and a target wake-up word of the terminal; and sending, based on the comparison result, a secondary determination result to the terminal, and determining, by the terminal, whether to perform a wake-up operation on the basis of the secondary determination result. The secondary determination result includes a wake-up confirmation and a non-wake-up confirmation.

In some embodiments, the sending, based on the comparison result, a secondary determination result to the terminal includes: sending, in response to determining the speech recognition result matching the target wake-up word, the wake-up confirmation to the terminal; and sending, in response to determining the speech recognition result not matching the target wake-up word, the non-wake-up confirmation to the terminal.

In a third aspect, the embodiments of the present disclosure provide a voice awakening device. The device includes: a receiving unit, configured to receive voice information of a user; a generation unit, configured to obtain an awakening confidence level corresponding to the voice information based on the voice information; a first determination unit, configured to determine, on the basis of the awakening confidence level, whether the voice information is suspected wake-up voice information; and a second determination unit, configured to perform, in response to determining the voice information being the suspected wake-up voice information, a secondary determination on the voice information to obtain a secondary determination result, and determine whether to perform a wake-up operation on the basis of the secondary determination result.

In some embodiments, the generation unit is further configured to: input the voice information into a pre-established recognition model to obtain the awakening confidence level for the voice information. The recognition model is used to represent a corresponding relationship between the voice information and the awakening confidence level.

In some embodiments, the recognition model is a neural network model, and the device further includes a model training unit. The model training unit includes: an acquisition unit, configured to acquire a sample set, wherein a sample includes sample voice information and an annotation indicating whether the sample voice information is wake-up voice information; and a performing unit, configured to perform following training: inputting respectively at least one piece of sample voice information in the sample set into an initial neural network model, to obtain a prediction corresponding to each of the at least one piece of sample voice information, wherein the prediction represents a probability of the sample voice information being the wake-up voice information; comparing the prediction corresponding to the each of the at least one piece of sample voice information with the annotation; determining, on the basis of the comparison result, whether the initial neural network model achieves a preset optimization objective; and using, in response to determining the initial neural network model achieving the preset optimization objective, the initial neural network model as a trained neural network model.

In some embodiments, the model training unit further includes: an adjusting unit, configured to adjust, in response to determining the initial neural network model not achieving the preset optimization objective, a network parameter of the initial neural network model, and continue to perform the training.

In some embodiments, the annotation includes a first identifier and a second identifier. The first identifier represents that the sample voice information is the wake-up voice information, and the second identifier represents that the sample voice information is not the wake-up voice information.

In some embodiments, the secondary determination result includes a wake-up confirmation and a non-wake-up confirmation. The second determination unit is further configured to: send the voice information to a server end, and generate, by the server end, the secondary determination result based on the voice information; receive the secondary determination result; and perform, in response to determining the secondary determination result being the wake-up confirmation, the wake-up operation.

In a fourth aspect, the embodiments of the present disclosure provide a voice awakening device. The device includes: an information receiving unit, configured to receive suspected wake-up voice information sent by a terminal; a recognizing unit, configured to perform speech recognition on the suspected wake-up voice information to obtain a speech recognition result; a comparison unit, configured to compare the speech recognition result and a target wake-up word of the terminal; and an information sending unit, configured to send, based on the comparison result, a secondary determination result to the terminal, and determine, by the terminal, whether to perform a wake-up operation on the basis of the secondary determination result. The secondary determination result includes a wake-up confirmation and a non-wake-up confirmation.

In some embodiments, the information sending unit is further configured to: send, in response to determining the speech recognition result matching the target wake-up word, the wake-up confirmation to the terminal; and send, in response to determining the speech recognition result not matching the target wake-up word, the non-wake-up confirmation to the terminal.

In a fifth aspect, the embodiments of the present disclosure provide a terminal. The terminal includes: one or more processors; and a storage device, configured to store one or more programs. The one or more programs, when executed by the one or more processors, cause the one or more processors to implement the method according to any embodiment in the first aspect.

In a sixth aspect, the embodiments of the present disclosure provide a computer readable storage medium storing a computer program. The computer program, when executed by a processor, implements the method according to any embodiment in the first aspect.

In a seventh aspect, the embodiments of the present disclosure provide a server. The server includes: one or more processors; and a storage device, configured to store one or more programs. The one or more programs, when executed by the one or more processors, cause the one or more processors to implement the method according to any embodiment in the second aspect.

In an eighth aspect, the embodiments of the present disclosure provide a computer readable storage medium storing a computer program. The computer program, when executed by a processor, implements the method according to any embodiment in the second aspect.

According to the voice awakening method and device provided by the embodiments of the present disclosure, the awakening confidence level corresponding to the voice information is first obtained based on the voice information received from the user. Then, on the basis of the awakening confidence level, it is determined that whether the voice information is suspected wake-up voice information. Next, in response to determining the voice information being the suspected wake-up voice information, the secondary determination is performed on the voice information to obtain the secondary determination result and whether to perform the wake-up operation is determined on the basis of the secondary determination result, thereby realizing a secondary verification on the suspected wake-up voice information. Thus, the probability that a smart device is mistakenly awakened may is reduced.

BRIEF DESCRIPTION OF THE DRAWINGS

After reading detailed descriptions of non-limiting embodiments given with reference to the following accompanying drawings, other features, objectives, and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
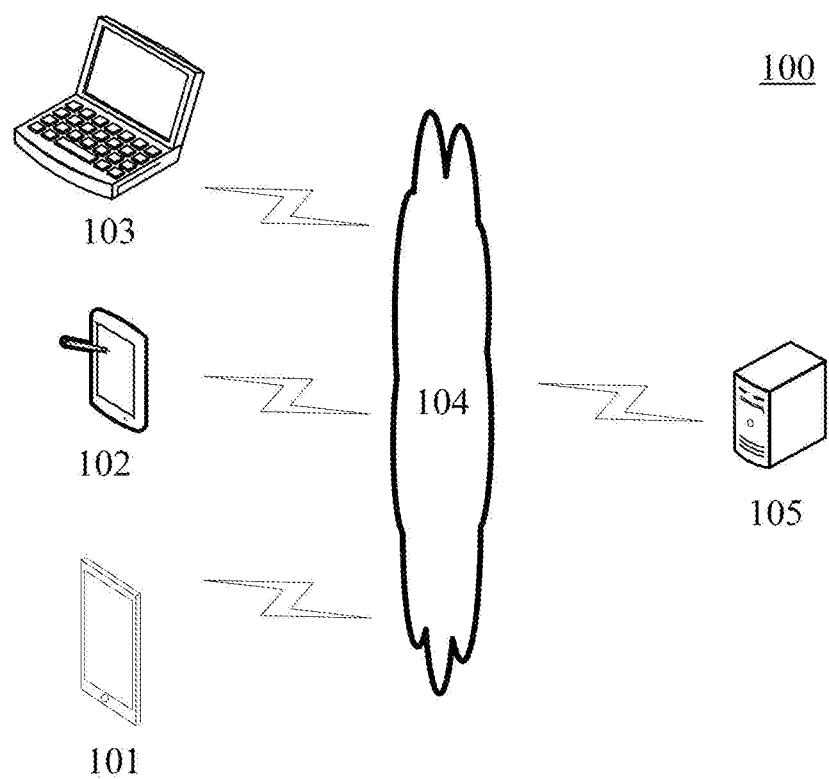
FIG. 1 illustrates an illustrative system architecture in which the present disclosure may be applied.

FIG. 1 shows an illustrative architecture of a system 100 which may be used by a voice awakening method or a voice awakening apparatus according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as webbrowser applications, shopping applications, search applications, instant messaging tools, mailbox clients, and social platform software may be installed on the terminal devices 101, 102, and 103.

The terminal devices 101, 102, and 103 may be various electronic devices capable of receiving voice information, including but not limited to, smart phones, smart watches, smart robots, smart speakers, smart televisions, and smart fridges.

The server 105 may be a server providing various services, for example, a back end server processing the information sent by the terminal device 101, 102 or 103. The back end server may perform a secondary determination on the voice information sent by the terminal device 101, 102 or 103, and return the secondary determination result to the terminal device.

Figure 2:
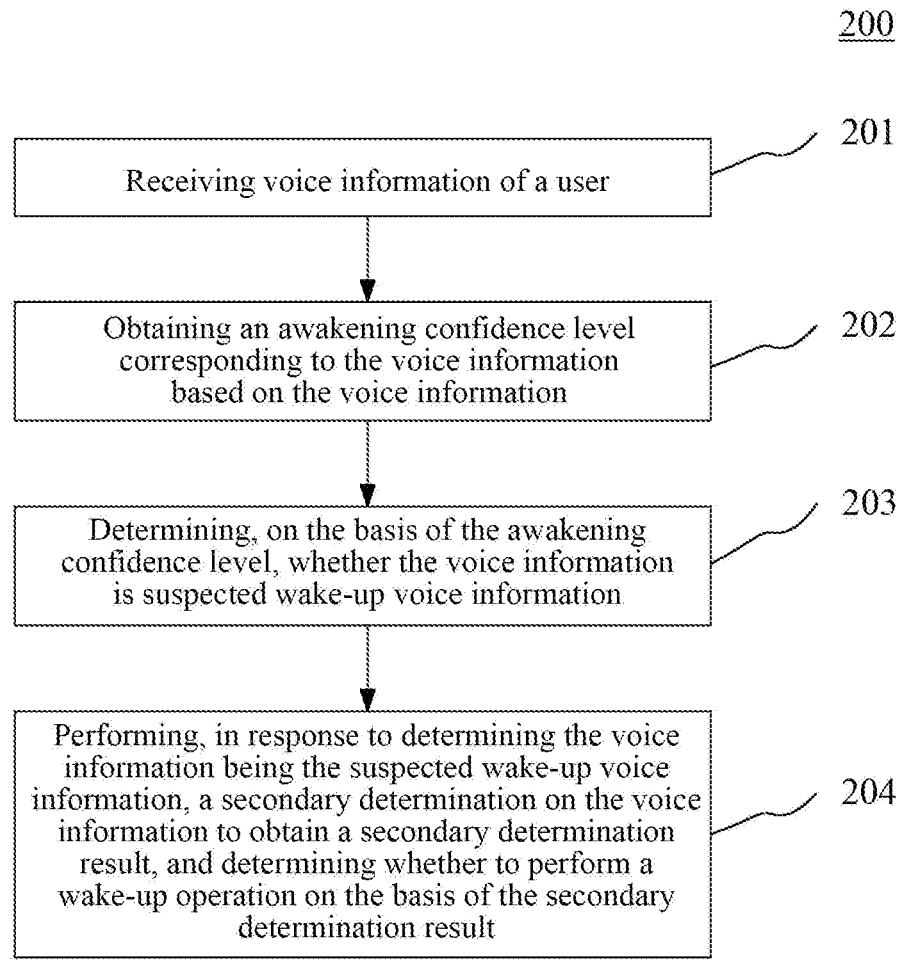
FIG. 2 is a flowchart of an embodiment of a voice awakening method according to the present disclosure.
Figure 5:
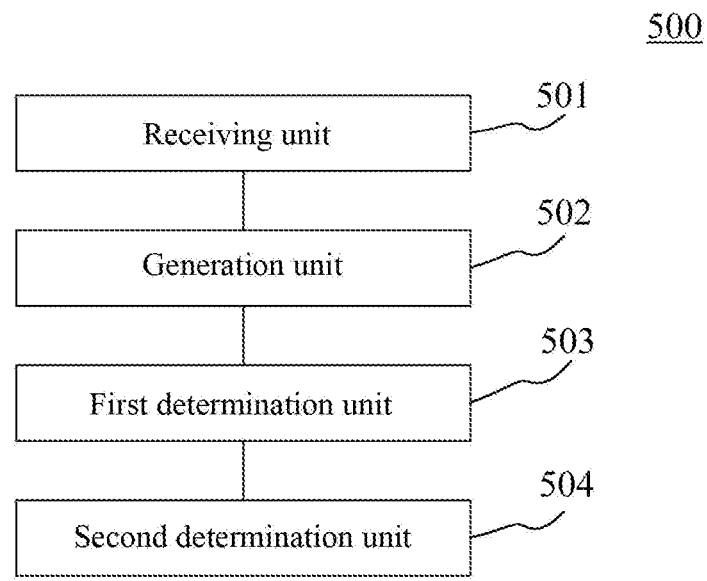
FIG. 5 is a schematic structural diagram of an embodiment of a voice awakening apparatus according to the present disclosure.
Figure 6:
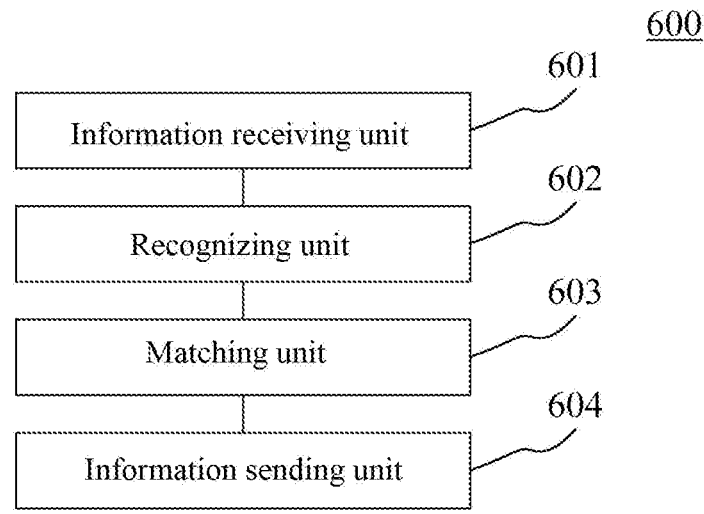
FIG. 6 is a schematic structural diagram of another embodiment of the voice awakening apparatus according to the present disclosure.

It should be noted that the voice awakening method according to the embodiments of FIG. 2 the present application is generally executed by the terminal devices 101, 102, or 103. Accordingly, the voice awakening apparatus according to the embodiments of FIG. 5 is generally installed on the terminal devices 101, 102, or 103. The voice awakening method according to the embodiments of FIG. 4 the present application is generally executed by the server 105. Accordingly, the voice awakening apparatus according to the embodiments of FIG. 6 is generally installed on the server 105.

It should be appreciated that the numbers of the terminal devices, the networks and the servers in FIG. 1 are merely illustrative. Any number of terminal devices, networks and servers may be provided based on the actual requirements.

Further referring to FIG. 2, the flow 200 of an embodiment of a voice awakening method according to the present disclosure is illustrated. The voice awakening method includes the following steps.

Step 201, receiving voice information of a user.

In this embodiment, an electronic device (e.g., the terminal devices 101, 102, and 103 as illustrated in FIG. 1) on which the voice awakening method is performed may receive the voice information sent by the user. As an example, when being in an operating status, the electronic device may monitor the ambient sounds in real time, to receive the voice information of the user.

Step 202, obtaining an awakening confidence level corresponding to the voice information based on the voice information.

In this embodiment, the electronic device may obtain in various ways the awakening confidence level corresponding to the voice information based on the voice information received in step 201. The awakening confidence level may be used to represent the probability that the voice information is the wake-up voice for awakening the electronic device. As an example, the electronic device may first extract the characteristic of the voice information, and then compare the characteristic of the voice information with the characteristic of preset standard wake-up voice information, and finally obtain the awakening confidence level of the voice information on the basis of the comparison result.

In some alternative implementations of this embodiment, step 201 may include the following step. The electronic device may input the voice information received in step 201 into a pre-established recognition model to obtain the awakening confidence level for the voice information. Herein, the recognition model may be used to characterize the corresponding relationship between the voice information and the awakening confidence level. As an example, the recognition model may first extract characteristic information in the voice information to obtain a characteristic vector, and then obtain the awakening confidence level for the voice information according to a pre-established corresponding relationship table of the characteristic vector and the awakening confidence level. It should be noted that the corresponding relationship table of the characteristic vector and the awakening confidence level may be a corresponding relationship table storing a plurality of corresponding relationships between the characteristic vectors and the awakening confidence levels, which is pre-established by one of ordinary skill in the art on the basis of the statistics on a large number of characteristic vectors and a large number of awakening confidence levels. In addition, extracting characteristic information in the voice information to obtain the characteristic vector is the common technique widely researched and applied at present, which will not be repeatedly described herein.

In some alternative implementations, the recognition model may be a neural network model. Herein, the neural network model may be an artificial neural network. The artificial neural network simulates human brain neurons in the perspective of information processing, to establish a simple model. Different networks are formed by means of different connections. The artificial neural network is generally formed by connecting a large number of nodes (or referred to as neurons), and each node represents a specific output function (referred to as an activation function). The connection between every two nodes represents a weight value for the signal passing through the connection, which is referred to as a weight (also referred to as a parameter). The output of the network varies according to the connection, the weight value and the activation function of the network. The neural network model may be trained by the above electronic device or other electronic devices for training the neural network model in the following way.

First, a sample set is acquired. A sample may include sample voice information and an annotation indicating whether the sample voice information is the wake-up voice information. Then, the following training steps may be performed. S1, at least one piece of sample voice information in the sample set may be respectively inputted into an initial neural network model, to obtain a prediction corresponding to each of the at least one piece of sample voice information. The prediction may represent the probability that the sample voice information is the wake-up voice information. S2, the prediction corresponding to the each of the at least one piece of sample voice information is compared with the annotation. S3, whether the initial neural network model achieves a preset optimization objective is determined on the basis of the comparison result. As an example, the optimization objective may be that the difference between the prediction and the annotation is less than a preset difference threshold. As another example, the optimization objective may be that the prediction accuracy of the initial neural network model is greater than a preset accuracy threshold. S4, in response to determining that the initial neural network model achieves the preset optimization objective, the initial neural network model may be used as a trained neural network model. Herein, the initial neural network model may be an untrained neural network model or a neural network model on which the training is not completed.

Alternatively, the steps of training the neural network model may further include the following step. S5, in response to determining that the initial neural network model does not achieve the preset optimization objective, a network parameter of the initial neural network model may be adjusted, and the training steps are continuously performed. As an example, a network parameter of the initial neural network model may be adjusted using a back propagation algorithm (BP algorithm) and a gradient descent method (e.g., a stochastic gradient descent algorithm). It should be noted that the back propagation algorithm and the gradient descent method are common technologies widely researched and applied at present, which will not be repeatedly described herein.

In some alternative implementations, the annotation may include a first identifier and a second identifier. The first identifier may represent that the sample voice information is the wake-up voice information. The second identifier may represent that the sample voice information is not the wake-up voice information. For example, the first identifier may be 1, and the second identifier may be 0.

Step 203, determining, on the basis of the awakening confidence level, whether the voice information is suspected wake-up voice information.

In this embodiment, on the basis of the awakening confidence level obtained in step 202, the electronic device may determine whether the voice information is the suspected wake-up voice information. As an example, according to at least one preset threshold, the electronic device may determine whether the voice information is the suspected wake-up voice information. For example, a threshold may be preset. When the awakening confidence is greater than the threshold, it may be determined that the voice information is the wake-up voice for awakening the electronic device. At this time, the electronic device may perform a wake-up operation. When the awakening confidence level is less than the threshold, it may be determined that the voice information is the suspected wake-up voice information. As another example, a first threshold, a second threshold, and a third threshold may be sequentially set in ascending order. When the awakening confidence level is less than the first threshold, it may be determined that the voice information is not the wake-up voice for awakening the electronic device. When the awakening confidence level is greater than the first threshold and less than the second threshold, it may be determined that the voice information is the suspected wake-up voice information. When the awakening confidence level is greater than the second threshold, it may be determined that the voice information is the wake-up voice for awakening the electronic device. At this time, the electronic device may perform the wake-up operation.

Step 204, performing, in response to determining the voice information being the suspected wake-up voice information, a secondary determination on the voice information to obtain a secondary determination result, and determining whether to perform a wake-up operation on the basis of the secondary determination result.

In this embodiment, in response to determining that the voice information is the suspected wake-up voice information, the electronic device may perform the secondary determination on the voice information to obtain the secondary determination result, and determine whether to perform the wake-up operation on the basis of the secondary determination result.

In some alternative implementations of this embodiment, the secondary determination result may include a wake-up confirmation and a non-wake-up confirmation. The step 204 may include the following steps. First, the electronic device may send the voice information to a server end, and the server end generates the secondary determination result based on the voice information. Then, the electronic device may receive the secondary determination result from the server end. Finally, in response to determining that the secondary determination result is the wake-up confirmation, the electronic device may perform the wake-up operation. Herein, the server end may be hardware or software. When being the hardware, the server end may be a distributed server cluster or a server. When being the software, the server end may be a distributed service or a service provided by the software, which is not limited herein.

As an example, the server end may first perform speech recognition on the voice information to obtain the text information corresponding to the voice information. Then, the server end may compare the obtained text information and a target wake-up word of the electronic device. Finally, the secondary determination result is generated on the basis of the comparison result. Herein, the target wake-up word of the electronic device may be used to awaken the electronic device. Generally, the user may make the electronic device perform the wake-up operation by speaking the target wake-up word, so that the electronic device switches from the standby state to the wake-up state. When being in the wake-up state, the electronic device may interact with the user.

Figure 3:
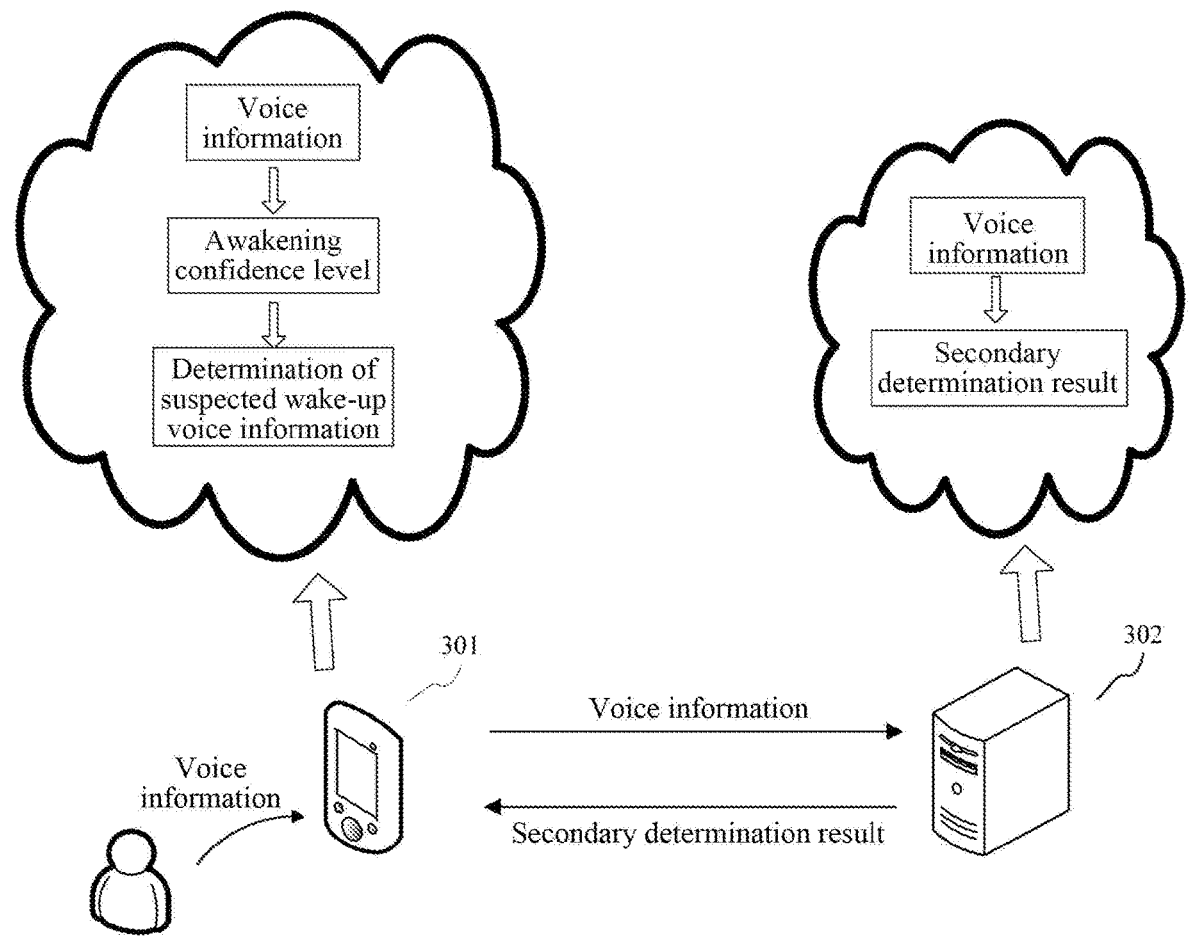
FIG. 3 is a schematic diagram of an application scenario of the voice awakening method according to the present disclosure.

Further referring to FIG. 3, a schematic diagram of an application scenario of the voice awakening method according to the embodiment is shown. In the application scenario of FIG. 3, the smart device 301 first receives the voice information sent by the user. Afterwards, the smart device 301 may obtain the awakening confidence level corresponding to the voice information based on the voice information. Then, on the basis of the awakening confidence level, the smart device 301 may determine whether the voice information is the suspected wake-up voice information. Next, in response to determining that the voice information is the suspected wake-up voice information, the smart device 301 may send the voice information to the server end 302, and the server end 302 generates the secondary determination result based on the voice information. Finally, the smart device 301 may receive the secondary determination result, and determine whether to perform the wake-up operation on the basis of the secondary determination result.

The method provided by some embodiments of the present disclosure may effectively reduce the probability that the smart device is mistakenly awakened, by performing a secondary verification on the suspected wake-up voice information.

Figure 4:
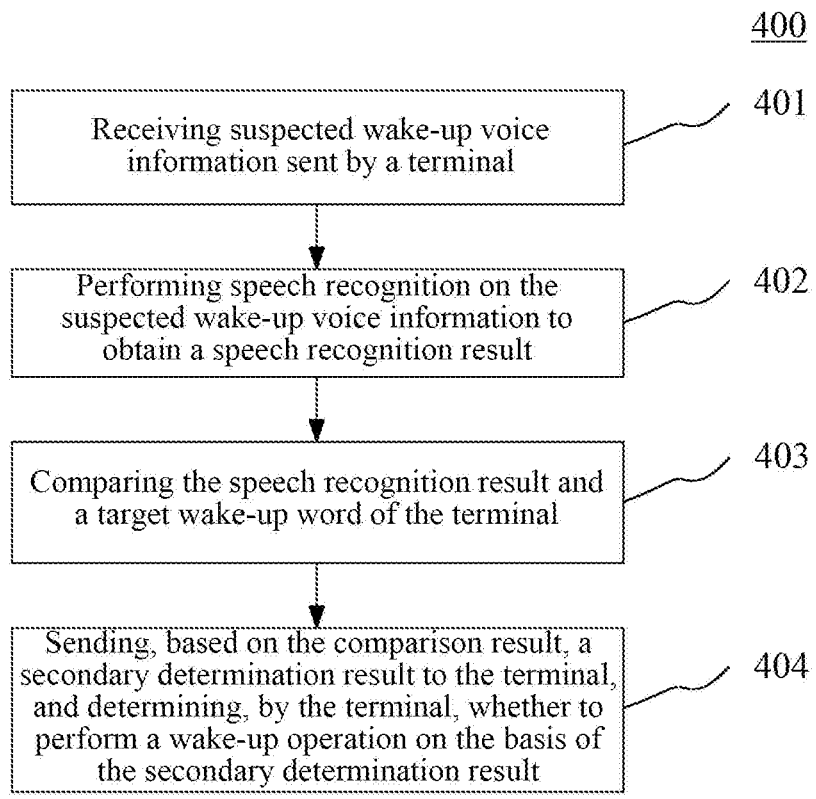
FIG. 4 is a flowchart of another embodiment of the voice awakening method according to the present disclosure.

Further referring to FIG. 4, the flow 400 of another embodiment of the voice awakening method is illustrated. The flow 400 of the voice awakening method includes the following steps.

Step 401, receiving suspected wake-up voice information sent by a terminal.

In this embodiment, an electronic device (e.g., the server 105 shown in FIG. 1) on which the voice awakening method is performed may receive the suspected wake-up voice information from the terminal by means of a wired connection or a wireless connection, and the terminal is used by the user to perform a voice interaction. It should be noted that the wireless connection may include, but not limited to, a 3G/4G connection, a WiFi connection, a Bluetooth connection, a WiMAX connection, a Zigbee connection, an UWB (ultra wideband) connection, and other wireless connections now known or developed in the future.

Step 402, performing speech recognition on the suspected wake-up voice information to obtain a speech recognition result.

In this embodiment, the electronic device may perform the speech recognition on the suspected wake-up voice information received in step 401, to obtain the speech recognition result. As an example, the electronic device may perform the speech recognition on the suspected wake-up voice information, to obtain the text information corresponding to the suspected wake-up voice information. It should be noted that the speech recognition technology is the common technology widely researched and applied at present, which will not be repeatedly described herein.

Step 403, comparing the speech recognition result and a target wake-up word of the terminal.

In this embodiment, the electronic device may compare the speech recognition result and the target wake-up word of the terminal. As an example, when the speech recognition result includes the target wake-up word, it is considered that they match. When the speech recognition result does not include the target wake-up word, it is considered that they do not match.

Step 404, sending, based on the comparison result, a secondary determination result to the terminal, and determining, by the terminal, whether to perform a wake-up operation on the basis of the secondary determination result.

In this embodiment, the electronic device may send the secondary determination result to the terminal on the basis of the comparison result, and the terminal determines whether to perform the wake-up operation on the basis of the secondary determination result. Herein, the secondary determination result may include a wake-up confirmation or a non-wake-up confirmation.

In some alternative implementations of this embodiment, the step 404 may include the following steps. In response to determining the speech recognition result matching the target wake-up word, the electronic device may send the wake-up confirmation to the terminal. In response to determining the speech recognition result not matching the target wake-up word, the electronic device may send the non-wake-up confirmation to the terminal.

In the method provided by some embodiments of the present disclosure, the speech recognition may be performed on the suspected wake-up voice information, and the speech recognition result is compared with the target wake-up word of the terminal. The secondary determination result is generated on the basis of the comparison result, thereby realizing the verification on the suspected wake-up voice information. Thus, the probability that the terminal is mistakenly awakened may be effectively reduced.

Further referring to FIG. 5, as an implementation of the method shown in the above drawings, the present disclosure provides an embodiment of a voice awakening device. The embodiment of the device corresponds to the embodiment of the method shown in FIG. 2.

As shown in FIG. 5, the voice awakening device 500 of this embodiment includes: a receiving unit 501, a generation unit 502, a first determination unit 503, and a second determination unit 504. The receiving unit 501 is configured to receive voice information of a user. The generation unit 502 is configured to obtain an awakening confidence level corresponding to the voice information based on the voice information. The first determination unit 503 is configured to determine, on the basis of the awakening confidence level, whether the voice information is suspected wake-up voice information. The second determination unit 504 is configured to perform, in response to determining the voice information being the suspected wake-up voice information, a secondary determination on the voice information to obtain a secondary determination result, and determine whether to perform a wake-up operation on the basis of the secondary determination result.

In this embodiment, for specific processes of the receiving unit 501, the generation unit 502, the first determination unit 503, and the second determination unit 504 in the voice awakening device 500, and their technical effects, reference may be made to relative descriptions of step 201, step 202, step 203, and step 204 in the corresponding embodiment of FIG. 2 respectively, which will not be repeatedly described herein.

In some alternative implementations of this embodiment, the generation unit 502 may further be configured to: input the voice information into a pre-established recognition model to obtain the awakening confidence level for the voice information. The recognition model is used to represent a corresponding relationship between the voice information and the awakening confidence level.

In some alternative implementations of this embodiment, the recognition model is a neural network model, and the device 500 may further include a model training unit (not shown). The model training unit may include: an acquisition unit (not shown), configured to acquire a sample set, wherein a sample includes sample voice information and an annotation indicating whether the sample voice information is wake-up voice information; and a performing unit (not shown), configured to perform following training: inputting respectively at least one piece of sample voice information in the sample set into an initial neural network model, to obtain a prediction corresponding to each of the at least one piece of sample voice information, wherein the prediction represents a probability of the sample voice information being the wake-up voice information; comparing the prediction corresponding to the each of the at least one piece of sample voice information with the annotation; determining, on the basis of the comparison result, whether the initial neural network model achieves a preset optimization objective; and using, in response to determining the initial neural network model achieving the preset optimization objective, the initial neural network model as a trained neural network model.

In some alternative implementations of this embodiment, the model training unit may further include: an adjusting unit (not shown), configured to adjust, in response to determining the initial neural network model not achieving the preset optimization objective, a network parameter of the initial neural network model, and continue to perform the training.

In some alternative implementations of this embodiment, the annotation may include a first identifier and a second identifier. The first identifier represents that the sample voice information is the wake-up voice information, and the second identifier represents that the sample voice information is not the wake-up voice information.

In some alternative implementations of this embodiment, the secondary determination result may include a wake-up confirmation and a non-wake-up confirmation. The second determination unit 504 may further be configured to: send the voice information to a server end, and generate, by the server end, the secondary determination result based on the voice information; receive the secondary determination result; and perform, in response to determining the secondary determination result being the wake-up confirmation, the wake-up operation.

Further referring to FIG. 6, as an implementation of the method shown in the above drawings, the present disclosure further provides an embodiment of a voice awakening device. The embodiment of the device corresponds to the embodiment of the method shown in FIG. 4.

As shown in FIG. 6, the voice awakening device 600 of this embodiment includes: an information receiving unit 601, a recognizing unit 602, a comparison unit 603, and an information sending unit 604. The information receiving unit 601 is configured to receive suspected wake-up voice information sent by a terminal. The recognizing unit 602 is configured to perform speech recognition on the suspected wake-up voice information to obtain a speech recognition result. The comparison unit 603 is configured to compare the speech recognition result and a target wake-up word of the terminal. The information sending unit 604 is configured to send, based on the comparison result, a secondary determination result to the terminal, and determine, by the terminal, whether to perform a wake-up operation on the basis of the secondary determination result. The secondary determination result includes a wake-up confirmation and a non-wake-up confirmation.

In this embodiment, for specific processes of the information receiving unit 601, the recognizing unit 602, the comparison unit 603, and the information sending unit 604 in the voice awakening device 600, and their technical effects, reference may be made to relative descriptions of step 401, step 402, step 403, and step 404 in the corresponding embodiment of FIG. 4 respectively, which will not be repeatedly described herein.

In some alternative implementations of this embodiment, the information sending unit 604 may further be configured to: send, in response to determining the speech recognition result matching the target wake-up word, the wake-up confirmation to the terminal; and send, in response to determining the speech recognition result not matching the target wake-up word, the non-wake-up confirmation to the terminal.

Figure 7:
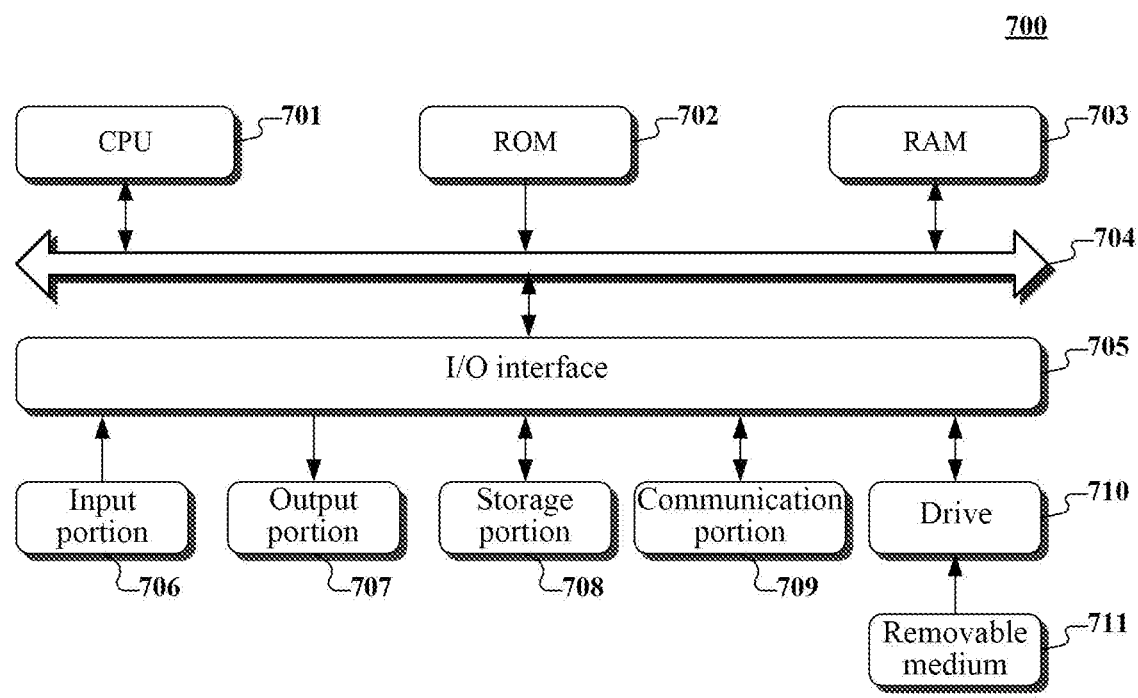
FIG. 7 is a schematic structural diagram of a computer system adapted to implement a terminal device according to the embodiments of the present disclosure.

Referring to FIG. 7, a schematic structural diagram of a computer system 700 adapted to implement a terminal device of the embodiments of the present application is shown. The terminal device shown in FIG. 7 is merely an example and should not impose any restriction on the function and scope of use of the embodiments of the present application.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A drive 710 is also connected to the I/O interface 705 as required. A removable medium 711, such as a magnetic disk, an optical disk, a magneto-optical disk, and a semiconductor memory, may be installed on the drive 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a receiving unit, a generation unit, a first determination unit, and a second determination unit, where the names of these units or modules do not in some cases constitute a limitation to such units or modules themselves. For example, the receiving unit may also be described as "a unit for receiving voice information of a user."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: receive voice information of a user; obtain an awakening confidence level corresponding to the voice information based on the voice information; determine, on the basis of the awakening confidence level, whether the voice information is suspected wake-up voice information; and perform, in response to determining the voice information being the suspected wake-up voice information, a secondary determination on the voice information to obtain a secondary determination result, and determine whether to perform a wake-up operation on the basis of the secondary determination result.

The above description only provides an explanation of the preferred embodiments of the present application and the technical principles used. It should be appreciated by one of ordinary skill in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A voice awakening method, comprising:
   receiving voice information of a user;
   inputting the voice information into a pre-established recognition model to obtain an awakening confidence level for the voice information by: extracting characteristic information in the voice information to obtain a characteristic vector, and obtaining the awakening confidence level for the voice information according to a pre-established corresponding relationship table, the pre-established corresponding relationship table storing a plurality of corresponding relationships between characteristic vectors and awakening confidence levels;
   determining, on the basis of the awakening confidence level, whether the voice information is suspected wake-up voice information; and
   performing, in response to determining the voice information being the suspected wake-up voice information, a secondary determination on the voice information to obtain a secondary determination result and determining whether to perform a wake-up operation on the basis of the secondary determination result;
   wherein determining the voice information being the suspected wake-up voice information comprises:
   in response to the awakening confidence level being greater than a preset first threshold and less than a preset second threshold, determining that the voice information is the suspected wake-up voice information.

2. The method according to claim 1, wherein the recognition model is used to represent a corresponding relationship between the voice information and the awakening confidence level.

3. The method according to claim 2, wherein the recognition model is a neural network model, and the neural network model is trained by:
   acquiring a sample set, wherein a sample includes sample voice information and an annotation indicating whether the sample voice information is wake-up voice information; and
   performing following training: inputting respectively at least one piece of sample voice information in the sample set into an initial neural network model, to obtain a prediction corresponding to each of the at least one piece of sample voice information, wherein the prediction represents a probability of the sample voice information being the wake-up voice information; comparing the prediction corresponding to the each of the at least one piece of sample voice information with the annotation; determining, on the basis of the comparison result, whether the initial neural network model achieves a preset optimization objective; and using, in response to determining the initial neural network model achieving the preset optimization objective, the initial neural network model as a trained neural network model.

4. The method according to claim 3, wherein the training the neural network model further comprises:
   adjusting, in response to determining the initial neural network model not achieving the preset optimization objective, a network parameter of the initial neural network model, and continuing to perform the training.

5. The method according to claim 3, wherein the annotation includes a first identifier and a second identifier, the first identifier represents that the sample voice information is the wake-up voice information, and the second identifier represents that the sample voice information is not the wake-up voice information.

6. The method according to claim 1, wherein the secondary determination result includes a wake-up confirmation and a non-wake-up confirmation, and
the performing a secondary determination on the voice information to obtain a secondary determination result and determining whether to perform a wake-up operation on the basis of the secondary determination result comprises:
sending the voice information to a server end, and generating, by the server end, the secondary determination result based on the voice information;
receiving the secondary determination result; and
performing, in response to determining the secondary determination result being the wake-up confirmation, the wake-up operation.

7. A voice awakening method, comprising:
receiving suspected wake-up voice information sent by a terminal, wherein an awakening confidence level corresponding to the suspected wake-up voice information is greater than a preset first threshold and less than a preset second threshold, and the wakening confidence level is obtained by inputting voice information of a user into a pre-established recognition model, extracting characteristic information in the voice information to obtain a characteristic vector, and obtaining the awakening confidence level for the voice information according to a pre-established corresponding relationship table, the pre-established corresponding relationship table storing a plurality of corresponding relationships between characteristic vectors and awakening confidence levels;
performing speech recognition on the suspected wake-up voice information to obtain a speech recognition result;
comparing the speech recognition result and a target wake-up word of the terminal; and
sending, based on a comparison result, a secondary determination result to the terminal, and determining, by the terminal, whether to perform a wake-up operation on the basis of the secondary determination result, the secondary determination result including a wake-up confirmation and a non-wake-up confirmation.

8. The method according to claim 7, wherein the sending, based on a comparison result, a secondary determination result to the terminal comprises:
sending, in response to determining the speech recognition result matching the target wake-up word, the wake-up confirmation to the terminal; and
sending, in response to determining the speech recognition result not matching the target wake-up word, the non-wake-up confirmation to the terminal.

9. A voice awakening device, comprising:
at least one processor; and
a memory storing instructions, the instructions when executed by the at least one processor, cause the at least one processor to perform operations, the operations comprising:
receiving voice information of a user;
inputting the voice information into a pre-established recognition model to obtain an awakening confidence level for the voice information by: extracting characteristic information in the voice information to obtain a characteristic vector, and obtaining the awakening confidence level for the voice information according to a pre-established corresponding relationship table, the pre-established corresponding relationship table storing a plurality of corresponding relationships between characteristic vectors and awakening confidence levels;
determining, on the basis of the awakening confidence level, whether the voice information is suspected wake-up voice information; and
performing, in response to determining the voice information being the suspected wake-up voice information, a secondary determination on the voice information to obtain a secondary determination result, and determining whether to perform a wake-up operation on the basis of the secondary determination result;
wherein determining the voice information being the suspected wake-up voice information comprises:
in response to the awakening confidence level being greater than a preset first threshold and less than a preset second threshold, determining that the voice information is the suspected wake-up voice information.

10. The device according to claim 9, wherein the recognition model is used to represent a corresponding relationship between the voice information and the awakening confidence level.

11. The device according to claim 10, wherein the recognition model is a neural network model, and the neural network model is trained by:
acquiring a sample set, wherein a sample includes sample voice information and an annotation indicating whether the sample voice information is wake-up voice information; and
performing following training: inputting respectively at least one piece of sample voice information in the sample set into an initial neural network model, to obtain a prediction corresponding to each of the at least one piece of sample voice information, wherein the prediction represents a probability of the sample voice information being the wake-up voice information; comparing the prediction corresponding to the each of the at least one piece of sample voice information with the annotation; determining, on the basis of a comparison result, whether the initial neural network model achieves a preset optimization objective; and using, in response to determining the initial neural network model achieving the preset optimization objective, the initial neural network model as a trained neural network model.

12. The device according to claim 11, wherein the training the neural network model further comprises:
adjusting, in response to determining the initial neural network model not achieving the preset optimization objective, a network parameter of the initial neural network model, and continuing to perform the training.

13. The device according to claim 11, wherein the annotation includes a first identifier and a second identifier, the first identifier represents that the sample voice information is the wake-up voice information, and the second identifier represents that the sample voice information is not the wake-up voice information.

14. The device according to claim 9, wherein the secondary determination result includes a wake-up confirmation and a non-wake-up confirmation, and the performing a secondary determination on the voice information to obtain a secondary determination result and determining whether to perform a wake-up operation on the basis of the secondary determination result comprises:

sending the voice information to a server end, and generating, by the server end, the secondary determination result based on the voice information;

receiving the secondary determination result; and performing, in response to determining the secondary determination result being the wake-up confirmation, the wake-up operation.

15. A voice awakening device, comprising:

at least one processor; and a memory storing instructions, the instructions when executed by the at least one processor, cause the at least one processor to perform operations, the operations comprising:

receiving suspected wake-up voice information sent by a terminal, wherein an awakening confidence level corresponding to the suspected wake-up voice information is greater than a preset first threshold and less than a preset second threshold, and the wakening confidence level is obtained by inputting voice information of a user into a pre-established recognition model, extracting characteristic information in the voice information to obtain a characteristic vector, and obtaining the awakening confidence level for the voice information according to a pre-established corresponding relationship table, the pre-established corresponding relationship table storing a plurality of corresponding relationships between characteristic vectors and awakening confidence levels;

performing speech recognition on the suspected wake-up voice information to obtain a speech recognition result;

comparing the speech recognition result and a target wake-up word of the terminal; and sending, based on a comparison result, a secondary determination result to the terminal, and determining, by the terminal, whether to perform a wake-up operation on the basis of the secondary determination result, the secondary determination result including a wake-up confirmation and a non-wake-up confirmation.

16. The device according to claim 15, wherein the sending, based on a comparison result, a secondary determination result to the terminal comprises:

sending, in response to determining the speech recognition result matching the target wake-up word, the wake-up confirmation to the terminal; and sending, in response to determining the speech recognition result not matching the target wake-up word, the non-wake-up confirmation to the terminal.

17. A non-transitory computer-readable storage medium storing a computer program, the computer program when executed by one or more processors, causes the one or more processors to perform operations of the method of claim 1.

18. A non-transitory computer-readable storage medium storing a computer program, the computer program when executed by one or more processors, causes the one or more processors to perform operations of the method of claim 7.

* * * * *